R. G. COWLES.
SIFTER.
APPLICATION FILED MAR. 15, 1911.
1,002,041.  Patented Aug. 29, 1911.
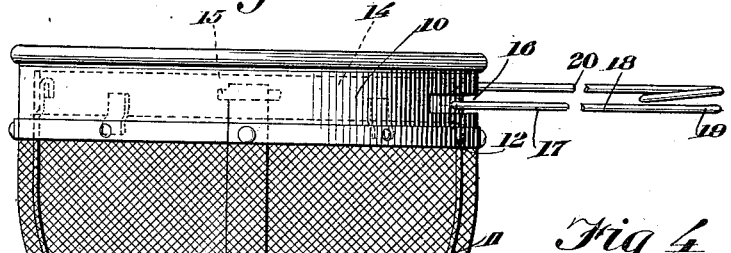
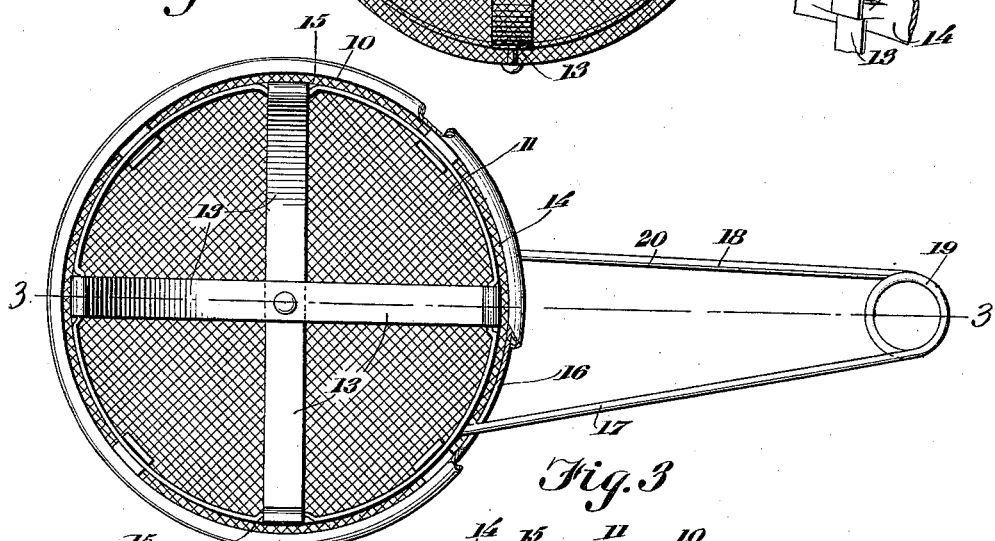
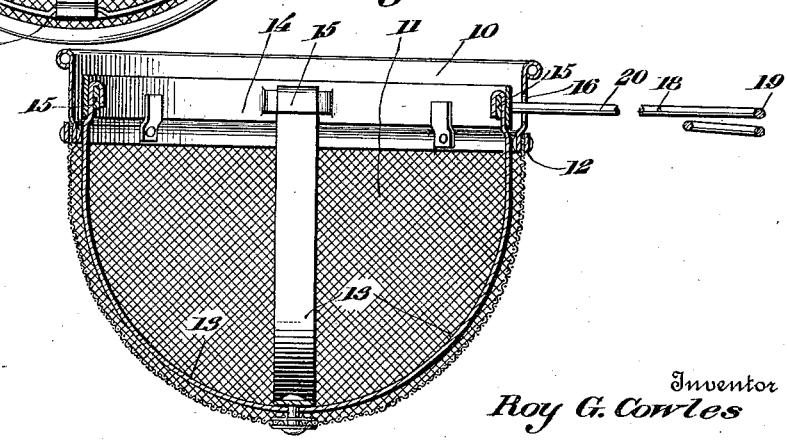
Inventor
Roy G. Cowles
Witnesses
By Victor J. Evans
Attorney

UNITED STATES PATENT OFFICE.

ROY G. COWLES, OF FLINT, MICHIGAN.

SIFTER.

1,002,041.  Specification of Letters Patent.  Patented Aug. 29, 1911.

Application filed March 15, 1911. Serial No. 614,652.

*To all whom it may concern:*

Be it known that I, ROY G. COWLES, a citizen of the United States, residing at Flint, in the county of Genesee and State of Michigan, have invented new and useful Improvements in Sifters, of which the following is a specification.

An object of the invention is to provide a sifter particularly adapted for sifting flour and has for an object to provide means whereby the sifter can be operated to sift the flour without imparting to the entire sifter a gyrating motion. For the purpose mentioned, use is made of a sifting body consisting substantially of a hemispherically shaped sieve, a series of bails pivotally mounted on the said sifting body and having their upper ends connected to a ring slidable on the upper end of the sifting body and a spring-controlled handle having its ends connected to the sifting body and to the ring so that when the ends of the handle are reciprocated, the said bails will operate in the sifting body, thus tending to sift the flour or other siftable material through the sieve of the sifting body.

Reference is to be had to the accompanying drawings constituting a part of this specification, in which similar characters of reference denote corresponding parts in all the views, and in which—

Figure 1 is a side elevation of my device. Fig. 2 is a plan view. Fig. 3 is a sectional view taken on the line 3—3 in Fig. 2. Fig. 4 is a fragmentary perspective view showing the manner of securing the bails to the ring or band.

Referring more particularly to the views I employ a sifting body 10, preferably hemispherical in shape and having a sieve portion 11 secured to a suitable band 12 extending exteriorly of the sifting body to connect the edges of the sifting body and the sieve. A plurality of bails 13 are mounted in the sifting body 10 and have their lower ends pivoted to the sieve 11, the upper ends of the bails 13 being secured to a ring 14 slidably mounted within the sifting body 10, the said ring 14 being provided with inwardly struck flanges 15 around which the ends of the bails 13 are bent to secure the same thereto. A slot 16 is formed in the sifting body 10 and an end 17 of the handle 18, provided with a spring portion 19, is adapted to pass through the slot 16 and is secured to the ring 14, the other end 20 of the handle 18 being secured to the sifting body 10 as shown in Figs. 1 and 2.

From the foregoing description it will be seen that the ring 14 is slidable relatively to the sifting body 10 and when flour is disposed in the sifting body 10 and the handle 18 is grasped so that the ends 17 and 20 thereof will be reciprocated, the bails 13 will operate within the sifting body, thus tending to sift the flour through the sieve 11 of the sifting body 10.

The particular construction of my device discloses a sifter which can be employed as a scoop so that when it is desired to fill the sifter with flour the said sifter can be used to scoop up the flour from the flour barrel, thus avoiding the use of an additional vessel for transferring the flour from the flour barrel to the sifter.

Having thus fully described the invention, what I claim as new, is:—

1. A sifter comprising a sifting body having a hemispherically shaped sieve secured thereto, a plurality of bails mounted to turn in the said sifting body and pivotally connected with the said sieve, a ring slidably mounted on the said sifting body with the upper ends of the said bails connected to the said ring and an integral spring handle having an end thereof secured to the sifting body and the other end thereof secured to the said ring for operating the said bails relatively to the said sifting body when the ends of the handle are operated to reciprocate.

2. In a sifter the combination of a sifting body consisting of a circular piece of material, a sieve secured to the said body and depending therefrom, a ring slidably mounted on the said sifting body and having a plurality of inwardly struck portions formed thereon, a plurality of bails mounted to turn in the said sifting body and having their lower ends pivotally mounted on the said sieve, the upper ends of the said bails being secured to the said inwardly struck portion and an integral handle having the end thereof secured to the said ring and the other end thereof secured to the said sifting body with the said handle formed into a spring between the said ends thereof so that when the handle is operated to reciprocatingly move the said handle ends, the said bails will be operated relatively to the sifting body.

In testimony whereof I affix my signature in presence of two witnesses.

ROY G. COWLES.

Witnesses:
 CLAUD M. BEAGLE,
 FRED DE MOINES.

Copies of this patent may be obtained for five cents each, by addressing the "Commissioner of Patents, Washington, D. C."